United States Patent [19]
Darilek

[11] Patent Number: 4,808,889
[45] Date of Patent: Feb. 28, 1989

[54] CIRCUIT FOR FLUORESCENT LIGHT POWER SUPPLY IN A BOREHOLE TELEVISION PROBE

[75] Inventor: Glenn T. Darilek, San Antonio, Tex.

[73] Assignees: Southwest Research Institute, San Antonio, Tex.; Gas Research Institute, Chicago, Ill.

[21] Appl. No.: 130,401

[22] Filed: Dec. 9, 1987

Related U.S. Application Data

[63] Continuation of Ser. No. 868,992, May 30, 1986, abandoned.

[51] Int. Cl.⁴ ............................................. H05B 37/02
[52] U.S. Cl. ................................. 315/291; 315/209 R; 315/219; 315/106; 315/DIG. 7
[58] Field of Search ............... 315/106, 219, 290, 307, 315/297, DIG. 7, 291, 224, 244, 245, 254

[56] References Cited

U.S. PATENT DOCUMENTS 2,586,403  2/1952  Waguet ............................... 315/290
2,586,405  2/1952  Waguet ............................... 315/290
4,544,863  10/1985  Hashimoto ...................... 315/DIG. 7

Primary Examiner—David K. Moore
Assistant Examiner—Michael Razavi
Attorney, Agent, or Firm—Gunn, Lee & Jackson

[57] ABSTRACT

A compact, low electrical noise power supply for fluorescent lights used in conjunction with a borehole television system. The outputs of first and second power sources are combined to initiate operation of the fluorescent light. After the operation of the light has been initiated, the second power source is disabled and the light is maintained in operation by the first source of electric power. In the preferred embodiment, the first source of electric power is a source of high voltage DC current and the second source of electric power is a high frequency oscillator. A transformer is provided to combine the outputs of the two sources of electric power. The operation of the oscillator is controlled by a momentary start switch which disables the oscillator after the light has been activated.

11 Claims, 1 Drawing Sheet

4,808,889

CIRCUIT FOR FLUORESCENT LIGHT POWER SUPPLY IN A BOREHOLE TELEVISION PROBE

CROSS-REFERENCES TO RELATED APPLICATIONS

This application is a continuation of prior U.S. patent application Ser. No. 868,992, filed May 30, 1986, now abandoned.

FIELD OF THE INVENTION

The present invention relates to power supplies for fluorescent lighting. More specifically, the present invention provides a compact, low electrical noise power source for fluorescent lamps used in conjunction with a borehole television system.

BACKGROUND OF THE INVENTION

It is well known that hydrocarbons fluoresce when exposed to ultraviolet illumination. An effective technique for utilizing this physical principle to detect the presence of hydrocarbons in geologic structure involves placing a long-wave ultraviolet light source ("blacklight") in a borehole to conduct in-situ fluorescence tests. Examination of the borehole wall for hydrocarbon fluorescence under ultraviolet light can indicate oil and condensates in small amounts which might not be detected by other means.

Fluorescent lamps have been found to be an efficient source of long-wave ultraviolet (UV) illumination for hydrocarbon fluorescence determination. One type of specialized fluorescent lamp emits UV light having a wavelength of 365 nanometers with only a small quantity of visible violet and blue light. This lamp, like other fluorescent lamps, requires a high initial voltage to start the lamp and a lower voltage, current-limited power supply thereafter. Previous power supplies having the necessary voltage and current characteristics for a fluorescent light system have been difficult to implement in borehole applications because of their physical size and electrical noise characteristics, as will be discussed briefly below.

Conventional fluorescent lamp power supply circuits normally provide the high initial voltage by interrupting the current in a series ballast inductor to provide a high voltage inductive spike. The ballast is designed with sufficient impedance or resistance to provide current limiting after the fluorescent tube ionizes. The ballast method is applicable to both AC and DC operation. However, because of the bulky size of the ballast, this method is very difficult to implement in borehole applications.

An alternate method for providing power to a borehole fluorescent light system employs an oscillator and transformer to provide the high voltage and current limiting features needed to operate a fluorescent bulb. Previous power supply systems based on an oscillator/transformer transformer combination are unsuitable for use in borehole television systems, however, because they tend to produce electrical noise interference which hampers the operation of video equipment. In particular, the continuous operation of a high frequency oscillator in the power supply circuit produces unwanted signals which are detected by the high gain, wide bandwidth amplifiers used to amplify the small signals from the video imaging device, such as a vidicon tube or solid state metal oxide semiconductor (MOS) imaging device.

SUMMARY OF THE INVENTION

In view of the difficulties inherent in using conventional fluorescent light power supply systems in borehole applications, the primary object of the present invention is to provide a fluorescent light power supply system which is extremely compact and which produces a very low electrical noise. In the broadest sense, the invention comprises first and second means for providing electric power to a fluorescent light and a means for temporarily combining the output of these power means to initiate operation of the light. The first means for providing electric power has sufficient output to maintain continuous operation of the lamp after it has been started, but does not have sufficient output to initiate operation of the light. The second means for providing electric power has sufficient output to initiate operation of the light when combined with the output of the first power means.

In the preferred embodiment, the first means for providing electric power is a source of current-limited, high voltage DC power which is connected to the fluorescent light through the secondary winding of a step-up transformer. The second means for providing electric power is the output of a high frequency oscillator which is connected to the primary winding of the transformer. The transformer serves to superimpose the AC output of the oscillator on the high voltage DC, thus providing a combined power output at a level which is sufficient to initiate operation of the light. An automatic momentary start switch controls the operation of the oscillator. Once the fluorescent lamp has been started by the combined AC and DC voltages, the start switch disables the AC oscillator and the lamp remains powered thereafter by the DC voltage alone.

Although one of the major applications for such a power supply system is for use in conjunction with borehole probe television systems, the invention power supply system is not limited to this specific application. Rather, the invention power supply system can be employed in virtually any application which requires a compact, low electrical noise power supply.

DETAILED DESCRIPTION OF THE PREFERRED EMBODIMENT

Figure 1:
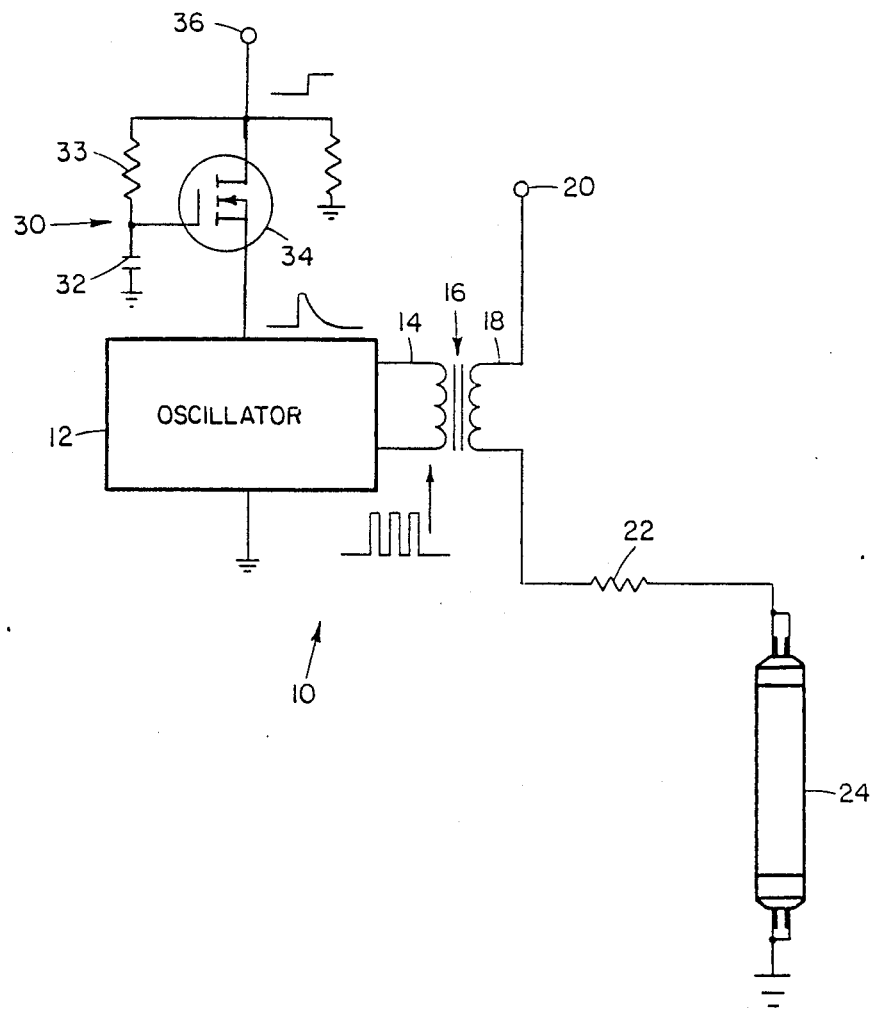
FIG. 1 is a schematic representation of the fluorescent light power supply of the present invention.

The fluorescent light power supply circuit 10 of the present invention is shown generally in the schematic of FIG. 1. The principal elements of the circuit 10 include an oscillator 12, a step-up transformer 16 and a momentary start switch 30. As will be discussed below, the momentary start switch 30 and the oscillator 12 are activated for a short period of time to start operation of the fluorescent bulb 24. Once the bulb 24 has been energized, it is maintained in an operational state by a source of high voltage DC power connected to the secondary winding 18 of the step-up transformer 16.

As can be seen in FIG. 1, the output of the oscillator 12 is used to drive the primary winding 14 of the step-up transformer 16. The oscillator 12 used in the preferred embodiment operates at a nominal frequency of 20 to 30 kHz, although other frequency ranges may be suitable depending on the specific characteristics of the fluorescent lamp employed.

In the invention power supply circuit, a source of high voltage DC power is connected to terminal 20 of the secondary coil 18 of the transformer 16. Such a source of high voltage DC power is typically available from the borehole television system with which the fluorescent light system is to be used. The other terminal of the secondary winding 18 of the transformer 16 is connected to the current-limiting resistor 22 which is further connected to one terminal of the fluorescent bulb 24. This particular method of connecting the step-up transformer 16 to the fluorescent bulb 24 is believed to be unique to the invention power supply circuit. In a conventional fluorescent light power supply circuit, one terminal of the secondary winding of the step-up transformer is typically connected to the fluorescent bulb, while the other terminal is connected to ground.

The voltage level of the DC power supply connected to the transformer secondary terminal 20 and the value of the current limiting resistor 22 are selected to provide the nominal operating voltage and current for the lamp 24. A typical range for the voltage supplied to terminal 20 is between 70 and 120 volts. As was mentioned above, however, this voltage is not sufficient to start the lamp 24. The starting voltage necessary to ionize the fluorescent lamp 24 is achieved by momentarily activating the oscillator 12, thus superimposing a high voltage AC signal on the DC voltage provided to the lamp 24.

The operation of the oscillator 12 is controlled by the momentary start switch 30 which is activated for a short time interval, on the order of a few milliseconds. Although a variety of switch circuits can be used to achieve the desired timing interval, the preferred embodiment of the start switch 30 is based on a Metal Oxide Semiconductor Field Effect Transistor (MOSFET) 34. The drain lead of the MOSFET 34 is connected to power terminal 36 which is provided with an appropriate level of low voltage DC power to trigger the start switch 30. In the preferred embodiment, the voltage applied to terminal 36 is between six and ten volts.

A capacitor 32 connected between the gate of the MOSFET 34 and ground determines the time interval during which the start switch 34 remains on. Once the switch 30 has been triggered, current begins to flow through resistor 33 and a charge begins to accumulate in the timing capacitor 32. When the capacitor 32 reaches a charged state sufficient to turn off the MOSFET 34, the start switch 30 turns off, thereby disabling the oscillator 12. The lamp 24 remains activated, however, due to the current-limited DC voltage supplied through the transformer secondary winding 18. The transformer secondary winding 18 provides some resistance to aid in limiting the current flow through the bulb 24. Additional resistance is provided by the current-limiting resistor 22.

When a fluorescent lamp is operated on DC power for an extended period of time, there is a tendency for the lamp to become dim at one end, thus providing uneven lighting. This phenomenon is related to polarization of the ionizing agent at one electrode of the lamp due to continuous current flow in one direction. The invention power supply system can be modified to overcome this tendency by incorporating a line-reversing switch to reverse the electrode polarity at predetermined time intervals.

The invention fluorescent light power supply system offers numerous advantages over prior fluorescent light power supplies for use in borehole applications. The preferred embodiment of the power supply is extremely compact and can easily be adapted for use on a borehole probe. Furthermore, the invention power supply has extremely low electrical noise and thus does not interfere with sensitive video equipment and other electronic instrumentation used in borehole applications.

Although the invention fluorescent light power supply has been described in connection with the preferred embodiment, it is not intended to limit the invention to the particular form set forth, but on the contrary, it is intended to cover such alternatives, modifications, and equivalents as may be included within the spirit and scope of the invention as defined by the appended claims.

I claim:

1. A lighting system comprising:
    means for producing ultraviolet light, said means having a starting voltage necessary to ionize said means;
    first means for providing electric power to said means for producing ultraviolet light, said first means for providing electric power comprising source of direct current, having sufficient output to maintain continuous operation of said means for producing ultraviolet light:
    second means comprising a source of alternating current including an oscillator for providing high voltage, low current electric power to said means for producing ultraviolet light, said second means for providing electric power having sufficient output to initiate operation of said means for producing ultraviolet light, without lowering said starting voltage, when combined with the output of said first means for providing electric power, said second means for providing electric power being separate and distinct from said first means for providing electric power, and said second means for providing electric power not being directly connected to said first means for providing electric power;
    means for combining the output of said first and second means for providing electric power in series for a period of time sufficient to initiate operation of said means for producing ultraviolet light and disabling said second means of electric power after operation of said means for producing ultraviolet light has been initiated; and
    means for controlling the combined output of said first and second means for providing electric power.

2. A lighting system according to claim 1, said means for producing ultraviolet light comprising a fluorescent light bulb.

3. A lighting system according to claim 1, said oscillator having an operating frequency range of 20 to 30 kilohertz.

4. A lighting system according to claim 1, said means for combining said first and second sources of electric power comprising a transformer having a primary winding and a secondary winding with each of said windings having at least two terminals, said terminals of said primary winding being connected to the output of said oscillator, said secondary winding having one terminal connected to said source of direct current and having another terminal connected to said means for producing ultraviolet light.

5. A lighting system according to claim 1, said means for controlling the combined output of said first and second power means comprising a switching circuit having a timed output.

6. A lighting system according to claim 5, said switching circuit comprising a field effect transistor.

7. A method of providing power to a fluorescent lamp having a starting voltage necessary to ionize the fluorescent lamp, comprising the steps of:
providing a first source of electric power to said fluorescent lamp, said first source of electric power comprising a source of direct current, having sufficient output to maintain continuous operation of said lamp;
providing a second source of electric power to said fluorescent lamp, said second source of electric power comprising a source of alternating current including an oscillator having sufficient output to initiate operation of said fluorescent lamp, without lowering said starting voltage, when combined with said first source of electric power, said first source of electric power being separate and distinct from said second source of electric power, and said first source of electric power not being directly connected to said second source of electric power;
combining said first and said second sources of electric power in series for a period of time sufficient to initiate operation of said fluorescent lamp;
disabling said second source of electric power after operation of said lamp has been initiated; and
maintaining continuous operation of said lamp by said first source of electric power alone.

8. The method according to claim 7, said oscillator having an operating frequency range of 20 to 30 kilohertz.

9. The method according to claim 7, said step of combining said first and second sources of electric power further comprising the step of connecting said sources of direct current and alternating current to a transformer having a primary and a secondary winding, said source of alternating current being connected to said primary winding, said source of direct current being connected to said secondary winding.

10. The method according to claim 7, said step of disabling said second source of electric power further comprising the step of controlling the operation of said oscillator with a switching circuit having a timed output, said switching circuit operable to stop operation of said oscillator at a predetermined time after said lamp has been activated.

11. The method according to claim 7, said momentary start switch comprising a field effect transistor and a timing capacitor.

* * * * *